United States Patent
Kumar et al.

(10) Patent No.: US 11,113,113 B2
(45) Date of Patent: Sep. 7, 2021

(54) SYSTEMS AND METHODS FOR SCHEDULING VIRTUAL MEMORY COMPRESSORS

(71) Applicant: Apple Inc., Cupertino, CA (US)

(72) Inventors: Derek R. Kumar, Cupertino, CA (US); Thomas Brogan Duffy, Jr., Larkspur, CA (US)

(73) Assignee: Apple Inc., Cupertino, CA (US)

( * ) Notice: Subject to any disclaimer, the term of this patent is extended or adjusted under 35 U.S.C. 154(b) by 113 days.

(21) Appl. No.: 15/853,239

(22) Filed: Dec. 22, 2017

(65) Prior Publication Data

US 2019/0079799 A1 Mar. 14, 2019

Related U.S. Application Data

(60) Provisional application No. 62/556,327, filed on Sep. 8, 2017.

(51) Int. Cl.
 *G06F 9/50* (2006.01)
 *G06F 9/48* (2006.01)

(52) U.S. Cl.
 CPC ............ *G06F 9/505* (2013.01); *G06F 9/4843* (2013.01); *G06F 9/5044* (2013.01); *G06F 2209/483* (2013.01); *G06F 2209/5022* (2013.01)

(58) Field of Classification Search
 None
 See application file for complete search history.

(56) References Cited

U.S. PATENT DOCUMENTS

| | | | |
|---|---|---|---|
| 5,623,610 A | 4/1997 | Knoll et al. | |
| 5,680,113 A | 10/1997 | Allen et al. | |
| 5,715,475 A | 2/1998 | Munson et al. | |
| 5,724,527 A | 3/1998 | Karnik et al. | |
| 5,838,996 A * | 11/1998 | deCarmo | G06T 9/00 710/68 |
| 5,991,831 A | 11/1999 | Lee et al. | |
| 6,009,480 A | 12/1999 | Pleso | |
| 6,011,781 A | 1/2000 | Bell | |
| 6,108,752 A | 8/2000 | VanDoren et al. | |
| 6,108,781 A | 8/2000 | Jayakumar | |
| 6,295,573 B1 | 9/2001 | Bailey et al. | |

(Continued)

*Primary Examiner* — Eric C Wai
(74) *Attorney, Agent, or Firm* — Rory D. Rankin; Kowert, Hood, Munyon, Rankin & Goetzel, P.C

(57) ABSTRACT

Systems, apparatuses, and methods for efficiently selecting compressors for data compression are described. In various embodiments, a computing system includes at least one processor and multiple codecs such as one or more hardware codecs and one or more software codecs executable by the processor. The computing system receives a workload and processes instructions, commands and routines corresponding to the workload. One or more of the tasks in the workload are data compression tasks. Current condition(s) are determined during the processing of the workload by the computing system. Conditions are determined to be satisfied based on comparing current selected characteristics to respective thresholds. In one example, when the compressor selector determines a difference between a target compression ratio and an expected compression ratio of the first codec exceeds a threshold, the compressor selector switches from hardware codecs to software codecs.

18 Claims, 8 Drawing Sheets

(56) References Cited

U.S. PATENT DOCUMENTS

| | | | |
|---|---|---|---|
| 6,389,029 B1 | 5/2002 | McAlear | |
| 6,389,495 B1 | 5/2002 | Larky et al. | |
| 6,389,526 B1 | 5/2002 | Keller et al. | |
| 6,496,503 B1 | 12/2002 | Pelissier et al. | |
| 6,560,654 B1 | 5/2003 | Fedyk et al. | |
| 6,760,838 B2 | 7/2004 | Owen et al. | |
| 7,161,506 B2 * | 1/2007 | Fallon | G06T 9/00 341/51 |
| 7,707,296 B2 * | 4/2010 | de Oliveira | H04L 12/1813 370/260 |
| 2010/0007773 A1 * | 1/2010 | O'Connell | H04N 19/132 348/239 |

* cited by examiner

SYSTEMS AND METHODS FOR SCHEDULING VIRTUAL MEMORY COMPRESSORS

CROSS REFERENCE TO RELATED APPLICATIONS

This application claims priority to Provisional Patent Application Ser. No. 62/556,327, entitled "Systems And Methods For Scheduling Virtual Memory Compressors", filed Sep. 8, 2017, the entirety of which is incorporated herein by reference.

BACKGROUND

Technical Field

Embodiments described herein relate to the field of computing systems and, more particularly, to efficiently selecting compressors for processing data.

Description of the Related Art

Generally speaking, a variety of computing systems include a processor and a memory, and the processor generates access requests for instructions and application data while processing one or more software applications. When fetching instructions and data, the processor checks a hierarchy of local cache memories and, if not found, the processor issues requests for the desired instructions and data to main memory or other storage such as, a CD-ROM, or a hard drive, for example.

At times, the number of software applications simultaneously running on the computing system reaches an appreciable number. In addition, a variety of computing systems include multiple processors such as a central processing unit (CPU), data parallel processors like graphics processing units (GPUs), digital signal processors (DSPs), and so forth. Therefore, the amount of instructions and data being used for processing the multiple software applications appreciably grows. However, the memory storage locations in the local cache memories have a limited amount of storage space. Therefore, swapping of the instructions and data between the local cache memories and the persistent storage occurs.

The swapping and corresponding latency for waiting for requested information to be loaded reduces performance for the computing system. To reduce an amount of storage for a particular quantity of data, the data is compressed. Such compression takes advantage of repeated sequences of individual data bits included in the data. When the data is to be accessed, the data is decompressed, and then possibly re-compressed once the access has been completed. The computing system may have multiple available options for data compression such as a hardware implementation for one or more compression/decompression (codecs) algorithms and a software implementation for codecs. In addition, the computing system may have multiple available compression algorithms. Selecting a non-optimal hardware/software implementation for a codec at a given time may lead to unnecessary inefficient compression, lower performance, higher power consumption, mismanaged memory and so forth.

In view of the above, methods and mechanisms for efficiently selecting compressors for processing data are desired.

SUMMARY

Systems and methods for efficiently selecting compressors for processing data are contemplated. In various embodiments, a computing system includes at least one processor and multiple codecs such as one or more hardware codecs and one or more software codecs executable by the processor. In some embodiments, the hardware codecs are within the processor. In other embodiments, one or more hardware codecs are located in other hardware units. The computing system also includes a compressor selector for selecting between hardware codes and software codecs based on behavior of the computing system as tasks are processed.

The computing system receives a workload and processes instructions, commands and routines corresponding to the workload. One or more of the tasks in the workload are data compression tasks. Particular characteristics of the computing system are used to determine whether a hardware codec or a software codec is a preferred codec for performing data compression. Some examples of characteristics are compression rate, compressed data throughput, compression ratio, memory storage utilization, energy efficiency (reduced power consumption), utilization of hardware resources and so forth. Selected characteristics may also include performance-power states (p-states) of the hardware resources, if p-states are used, which in turn may be a function of thermal constraints. Current condition(s) are determined during the processing of the workload by the computing system. Conditions are determined to be satisfied based on comparing current selected characteristics to respective thresholds.

When high priority conditions are satisfied, the compressor selector switches between hardware codecs and software codecs. When the high priority conditions are not satisfied, the compressor selector maintains the currently selected codecs. In one example, when the compressor selector determines a difference between a target compression ratio and an expected compression ratio of the first codec exceeds a threshold, the compressor selector switches from hardware codecs to software codecs. However, when the compressor selector determines an incoming rate of compression tasks is greater than a completion rate of compression tasks, the compressor selector switches from software codecs to hardware codecs.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

Figure 1:
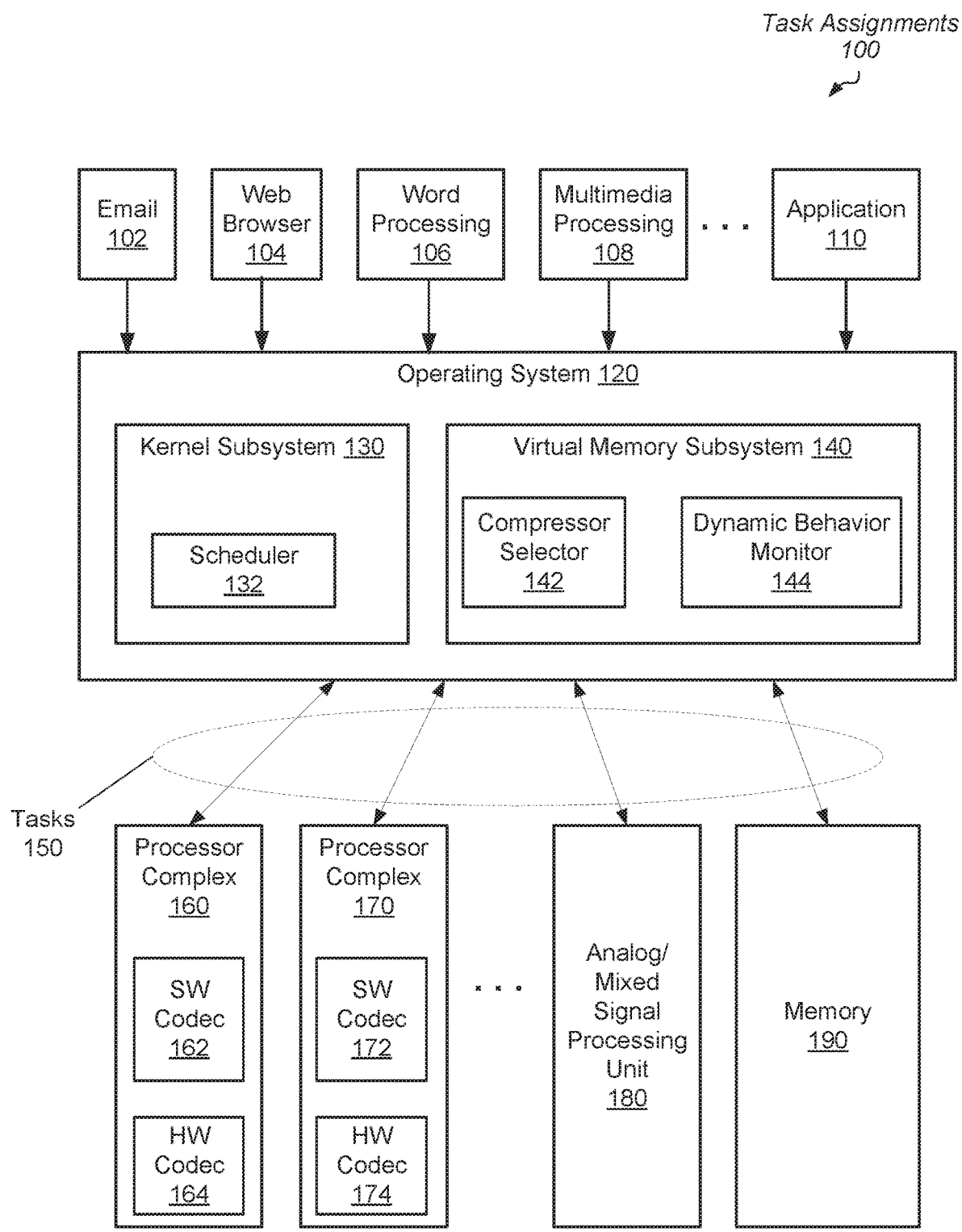
FIG. 1 is a block diagram of one embodiment of assigning tasks corresponding to one or more executing applications to hardware resources.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Turning to FIG. 1, a generalized block diagram illustrating one embodiment of task assignments 100 is shown. In the illustrated embodiment, operating system 120 assigns tasks corresponding to one or more executing applications to hardware resources. Operating system 120 is one of a variety of available operating systems. In some embodiments, a task is a software thread of execution, which is a subdivision of a software process. In other embodiments, a task is a transaction. A transaction includes an indication of a command for a particular operation, but the transaction does not include all of the resources of a thread or a process. In yet other embodiments, a non-transaction control signal is used to initiate the processing of steps of a given task. As shown, operating system 120 assigns tasks 150 corresponding to one or more executing applications of applications 102-110 to hardware resources.

As shown, applications may include an email application 102, a web browser 104, a word processing application 106, a multimedia processing application 108, and so forth. Application 110 represents one of a variety of other applications executed for a user. In an embodiment, hardware resources include processor complex 160 and 170 in addition to analog/mixed signal processing unit 180. In other embodiments, a variety of other types of hardware resources are also available such as input/output (I/O) peripheral devices, a display controller, a camera subsystem, and so forth.

Operating system 120 detects which ones of the applications 102-110 are executing or are indicated to begin executing, and allocates regions of memory 190 for the execution. In addition, operating system 120 selects which ones of the hardware resources to use for executing tasks 150 corresponding to the detected applications. One or more of the tasks 150 are compression tasks for compressing or decompressing data stored in memory 190. The compression task may include an asserted single bit in a particular bit position of the task or the compression task may include a multi-bit command indicating data compression or decompression is requested. For example, the indication for a compression task or a decompression task may be an alert such as a non-transaction control signal. Alternatively, the indication is an instruction or a generated transaction. The indication may include information, such as arguments or fields, which specify the data to compress or decompress. For example, the information may specify an address of a source page and an address of a destination or target page in memory 190.

In an embodiment, an indication to compress data may be generated by one of the applications 102-110 executing on a processor within one of the processor complexes 160-170. In another embodiment, the indication for a compression task is generated by control logic in operating system 120 based on a context switch between applications. For example, a user may switch from the email application 102 to the multimedia processing application 108 to the web browser application 104. The switches include context switches and operating system 120 handles the memory management for the context switches. In yet another embodiment, the indication for a compression task is generated based on a background process such as a garbage collection process.

Further still, in an embodiment, the indication is generated based on a background memory management and/or power management algorithm targeting a specified memory storage utilization. When an indication for a compression task is generated, compressor selector 142 selects whether data compression is performed by software or hardware. Further details are provided shortly. The indication to decompress data may be generated based on a context switch between applications to make the data ready for consumption by an application about to execute or execute again.

Memory 190 represents any of a variety of physical memory types such as synchronous DRAM (SDRAM), flash memory, disk memory, remote data storage devices, and so forth. Memory 190 may utilize a memory hierarchy such as a hierarchy used in a cache memory subsystem. Memory 190 may use one or more memory interfaces when communicating with the other hardware resources. Although operating system 120 is shown externally from memory 190, in various embodiments, operating system 120 is stored in memory 190, and copies of portions of operating system 120 are sent to one of processor complexes 160 and 170 for execution. In various embodiments, memory 190 stores source data for applications 102-110 in addition to result data and intermediate data generated during the execution of applications 102-110. Copies of the data is transferred between memory 190 and one or more caches within processing elements such as at least processor complexes 160-170.

As used herein, the term "processor complex" is used to denote a configuration of one or more processor cores using local storage, such as a shared cache memory subsystem, and configured to process a workload together. Additionally, the processor complex is coupled through a communication channel subsystem to other components. Each of the processor complexes 160-170 includes one or more processors used in a homogeneous architecture or a heterogeneous architecture depending on the embodiment.

In some embodiments, one or more of the processors are a general-purpose processor, such as a central processing unit (CPU), which utilizes circuitry for executing instructions according to a predefined general-purpose instruction set. In an embodiment, one or more of the processors use single instruction multiple data (SIMD) cores. Examples of SIMD cores are graphics processing units (GPUs), digital signal processing (DSP) cores, or otherwise. In various embodiments, one or more of the processor complexes 160-170 include one or more high-performance processor cores and one or more low-power (lower performance) processor cores. Each of the high-performance processor cores and the low-power processor cores may execute instructions of a same instruction set architecture (ISA), but the high-performance processor core has more functionality than the low-power processor core in addition to circuitry capable of processing instructions at a faster rate. For example, compared to the circuitry in the low-power processor core, the circuitry in the high-performance processor core may support a higher number of parallel executing threads, a higher number of simultaneous executing instructions, a higher clock frequency, more functional units, a higher operating supply voltage and so forth.

In some embodiments, processor complexes 160 includes processors, each with one or more cores with hardware circuitry for implementing hardware (HW) compression/decompression (codec) 164. Similarly, in an embodiment, processor complex 170 includes hardware support for implementing hardware (HW) compression/decompression (codec) 174. In some embodiments, each one of the HW codecs 164 and 174 implements a distinct algorithm used for data compression and decompression. In other embodiments, each one of the HW codecs 164 and 174 implements a general-purpose algorithm used for data compression and decompression. Although two HW codecs are shown, any number of compression/decompression algorithms may be implemented in circuitry and used in one or more processor cores. In other embodiments, the circuitry for the HW codecs 164 and 174 may be located externally from processors, but are still located within one of the processor complexes 160-170. In yet other embodiments, the circuitry for the HW codecs 164 and 174 may be located externally from the processor complexes 160-170 within a separate processing unit, an application specific integrated circuit (ASIC), or other.

In an embodiment, memory 190 also stores program code for software (SW) compression/decompression (codecs) 162 and 172. In some embodiments, each one of the SW codecs 162 and 172 implements a distinct algorithm used for data compression and decompression. Although two SW codecs are shown, any number of compression/decompression algorithms may be implemented in program code and stored in memory 190. When a given SW codec is selected for execution, a copy of the selected SW codec is retrieved from memory 190 and stored in a cache within one of the processor complexes 160-170. For example, if processor complex 160 is selected for executing the selected SW codec, an internal cache stores a copy of SW codec 162, which represents the selected SW codec. Alternatively, if processor complex 170 is selected for executing the selected SW codec, an internal cache stores a copy of SW codec 172, which represents the selected SW codec. In other embodiments, program code for one or more SW codecs are stored in a read only memory (ROM) within one or more of the processor complexes 160-170. Therefore, the selected SW codec is not retrieved from memory 190.

In an embodiment, kernel subsystem 130 within operating system 120 allocates regions within memory 190 for processes corresponding to executing applications of applications 102-110. Each process has at least a respective instance of instructions and data before application execution and an address space that addresses the code, data, and possibly a heap and a stack. Kernel subsystem 130 sets up an address space, such as a virtual address space, for each executing one of the applications 102-110, sets up a stack for the program, sets up a branch address pointing to a given location inside the application, and sends an indication to a selected hardware resource to begin execution one or more threads corresponding to the application.

In an embodiment, scheduler 132 within the kernel subsystem 130 includes control logic for assigning tasks to processing elements in the hardware resources. For example, scheduler 132 may assign tasks to particular processor cores within the processor complexes 160-170. In one embodiment, scheduler 132 also assigns compression tasks to hardware resources. In another embodiment, scheduler 132 assigns a given compression task to a particular one of these processor cores. In yet another embodiment, scheduler 132 assigns the given compression task to a particular one of the HW codecs 164 and 174 when these hardware codecs are separate processing elements these processor cores.

In an embodiment, scheduler 132 uses information from compressor selector 142 when assigning compression tasks to hardware resources. For example, compressor selector 142 may be configured to determine whether data compression for the given compression task is performed by software or hardware. If compressor selector 142 selects software, then scheduler 132 may select a particular processor core within the processor complexes 160-170 to execute a copy of one of the SW codecs 162 and 172. However, if compressor selector 142 selects hardware, then scheduler 132 may select a particular one of the HW codecs 164 and 174 to perform the data compression. In other embodiments, compressor selector 142 both selects between hardware and software in addition to assigning the given compression task to particular hardware resources.

In the illustrated embodiment, compressor selector 142 includes program code for implementing an algorithm for selecting between hardware and software when an indication is received for compressing data. In an embodiment, compressor selector 142 is part of the virtual memory subsystem 140 within operating system 120. In various embodiments, the virtual memory subsystem 140 performs virtual memory management, handles memory protection, cache control, and bus arbitration. In another embodiment, compressor selector 142 is software located externally from the virtual memory subsystem 140. In yet another embodiment, compressor selector 142 is not located within virtual memory subsystem 140, but rather, compressor selector 142 comprises hardware circuitry for implementing the algorithm for selecting between hardware and software when an indication is received for compressing data. For example, compressor selector 142 may be a separate application specific integrated circuit (ASIC) or another type of separate processing element. In yet other embodiments, the functionality of compressor selector 142 is implemented in both hardware and software.

In some embodiments, compressor selector 142 determines the selection between using a hardware codec and using a software codec for data compression based at least upon one or more reported factors from the dynamic behavior monitor 144. The reported factors are related to the dynamic behavior of the computing system. In some embodiments, the dynamic behavior monitor 144 receives and/or monitors and reports an incoming rate of compression tasks and a completion rate for compression tasks. The difference between these two rates indicates the compression workload for the computing system in addition to indicating whether the computing system is overburdened. For example, if the completion rate is larger, then the computing system may not be considered to be overburdened. If a higher compression ratio is desired, then compressor selector 142 may select one of the SW codecs 162 and 172, rather than select one of the HW codecs 164 and 174. The choice of which SW codec to select may be based at least upon the type of data to compress.

If the incoming rate of compression tasks exceeds the completion rate, then the computing system may be considered to be overburdened. In such a case, compressor selector 142 may select one of the HW codecs 164 and 174, rather than select one of the SW codecs 162 and 172. The choice of which HW codec to select may be based at least upon the type of data to compress. In other embodiments, other factors besides incoming rate and completion rate of compression tasks may have the highest priority. Multiple modes may be used, each with a different factor(s) being the highest priority. In some embodiments, comparator selector 142 is configurable to transition from one mode to another when determining to select a hardware codec or a software codec for data compression.

Figure 2:
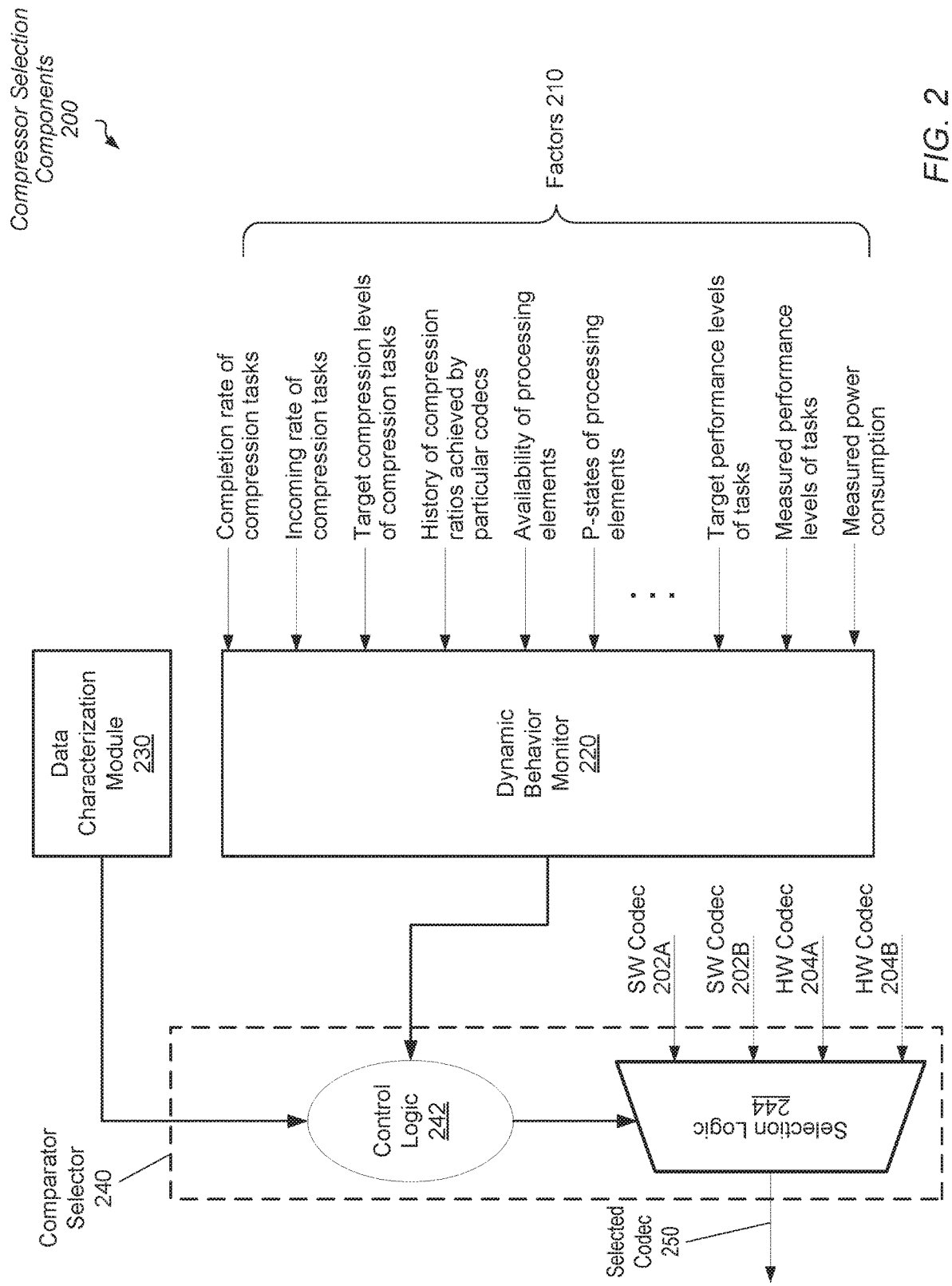
FIG. 2 is a block diagram of one embodiment of compressor selection components.

Referring now to FIG. 2, a generalized block diagram illustrating one embodiment of compressor selection components 200 is shown. As shown, components 200 includes dynamic behavior monitor 220, data characterization module 230 and comparator selector 240. Comparator selector 240 receives information from each of dynamic behavior monitor 220 and data characterization module 230, and generates a selected codec 250. In one embodiment, control logic 242 within comparator selector 240 receives the inputs and, via selection logic 244, selects one of the available codecs such as SW codecs 202A-202B and HW codecs 204A-204B. In some embodiments, the functionality of components 200 is implemented in software. For example, components 200 may be software modules within the operating system's virtual memory subsystem. Alternatively, program code providing the functionality of components 200 are stored in ROM, firmware, and so forth. In other embodiments, the functionality of components 200 is implemented in hardware such as an ASIC. In yet other embodiments, the functionality of components 200 is implemented as a combination of hardware and software.

In some embodiments, the selected codec 250 includes an indication specifying one of the SW codecs 202A-202B and HW codecs 204A-204B as well as an indication specifying the hardware resource to use for executing the selected codec. In another embodiment, the selected codec 250 includes an indication specifying a priority level. In other embodiments, one or more of the hardware resource, priority level and other information is determined at a later time by the operating system scheduler or a hardware processing unit, rather than comparator selector 240.

Although two software codecs and two hardware codecs are shown, in other embodiments, one to any number of codecs implemented in software are available. Similarly, in other embodiments, one to any number of codecs implemented in hardware are available. In an embodiment, SW codecs 202A-202B and HW codecs 204A-204B received by selection logic 244 may represent indications of the codecs. In some embodiments, the inputs to selection logic 244 may also indicate the hardware resource to use for executing the codec, the priority level, and so forth. As described above, in other embodiments, this further information is used by later logic such as the operating system scheduler.

In some embodiments, each of the SW codecs 202A-202B and HW codecs 204A-204B represents a distinct compression and decompression algorithm. In other embodiments where the inputs to selection logic 244 include at least an indication of hardware resources for executing selected codecs, two or more of the SW codecs 202A-202B and HW codecs 204A-204B represent a same compression and decompression algorithm. For example, each of the two HW codecs 204A-204B may represent a same compression and decompression algorithm, but the circuitry for implementing the algorithm are located at two separate hardware resources such as two separate processors or two separate processor complexes.

As shown, dynamic behavior monitor 220 receives a variety of factors 210. The factors 210 are used to determine a current state of operation for the computing system. The current state may be used by control logic 242 to determine whether to select a software codec for data compression or select a hardware codec for data compression. In some embodiments, the factors 210 include a completion rate of compression tasks, an incoming rate of compression tasks, target compression levels of compression tasks, a history of achieved compression ratios for particular codecs, availability of processing elements in the computing system, performance-power states (p-states) of processing elements, target performance levels of tasks, measured performance levels tasks and measured power consumption of one or more processing elements in the computing system. Other factors may include storage utilization of memory, target latencies for data compression, measured latencies for data compression, predicted latencies for data compression based on hardware vs software implementation and the particular compression algorithm, and so forth. A variety of other factors are also possible and contemplated for use in determining the state of operation of the computing system and for use in selecting a data compression codec. A variety of software and hardware methods for collecting the information provided in factors 210 may be used. The methods may be performed by processing elements external to dynamic behavior monitor 220 and/or performed by modules within dynamic behavior monitor 220.

In various embodiments, data characterization module 230 characterizes data such as determining the type of data to be compressed. In one embodiment, data characterization module 230 inspects an operating system tag describing the origin and use of the data. In another embodiment, data characterization module 230 samples the contents of the data to be compressed. In yet other embodiments, data characterization module 230 tracks a history of compression tasks and uses the history to predict the origin and use of the data as well as determine a suggestion for the type of codec to select for the data to be compressed.

In one embodiment, data characterization module 230 determines the type of data to be compressed and also determines an optimal hardware and/or software codec to use for data compression based on the determined data type. In another embodiment, data characterization module 230 determines the type of data to be compressed and control logic 242 determines the optimal hardware and/or software codec to use for data compression based on the determined data type. In one embodiment, a ranking of codecs is created for the data to be compressed. Following, control logic 242 combines the ranking with one or more factors 210 to determine which codec to use and which hardware resource to use for executing the codec.

To create the ranking of codecs, as described above, data characterization module 230 uses one of multiple methods for determining the type of data to compress. For example, image data may be compressed according to the joint photographic experts group (JPEG) compression algorithm, the graphics interchange format (GIF) compression algorithm, or some other type of image compression algorithm. Audio data may be compressed according to the free lossless audio codec (FLAC) compression algorithm, the Apple lossless audio codec (ALAC) compression algorithm, or some other type of audio compression algorithm. Video data may be compressed according to the moving pictures experts group (MPEG)-4 compression algorithm or some other type of video compression algorithm. Data with relatively many zeroes in it may be compressed with the WKdm hybrid compression algorithm, which combines dictionary-based and statistical-based techniques. In some embodiments, data which is not characterized by the other described data types is compressed with a general compression algorithm such as Lempel-Ziv, DEFLATE, Lempel-Ziv-Renau, and/or some other type of general data compression.

Control logic 242 receives inputs from both the dynamic behavior monitor 220 and the data characterization module 230. In some embodiments, control logic 242 includes programmable control registers for changing an algorithm for selecting between available software codecs and available hardware codecs. For example, two or more modes may be used to switch between multiple priorities. In one embodiment, a first mode prioritizes compression ratio. Therefore, if utilization of hardware resources is below a threshold, then a software codec is selected over a hardware codec. For example, if two processors are available with a first processor designed for lower power consumption, and therefore, produces less performance than a second processor, compression tasks may be assigned to the first processor. When the first processor is unavailable and the second processor is available, compression tasks are assigned to the second processor for executing a software codec despite the higher power consumption. A hardware codec is not selected in this case, since compression ratio has higher priority over power consumption in the first mode.

If both the first processor and the second processor are unavailable due to executing respective workloads and/or a measured performance level is below a threshold, then a hardware codec is selected for performing data compression despite the lower compression ratio of the hardware codec. Performing data compression on the hardware codec frees up the processor's hardware resources for executing applications. In other embodiments, a programmable delay is used for waiting to assign the compression task in this case in order to determine if either of the two processors becomes available during the delay. If so, then a software codec is assigned to the available processor for performing the data compression with a higher compression ratio than a ratio provided by the hardware codec.

In another embodiment, a second mode prioritizes power consumption. For example, a mobile device may use multiple techniques for extending the battery life. Selecting how to perform data compression may be one of the multiple techniques. Therefore, even when one or more processors are available for executing a copy of a software codec, a hardware codec is selected over the software codec. If allocated and valid data storage in memory exceeds a threshold, then a software codec is selected for performing data compression despite the lower power consumption (and lower compression ratio) of the hardware codec. Similar to the first mode, a programmable delay may be used for waiting to assign the compression task in this case in order to determine if storage space in memory becomes available during the delay. A variety of other modes in addition to the above first mode and second mode may be used for prioritizing characteristics of the computing system when selecting between using a software codec and a hardware codec for data compression.

Figure 3:
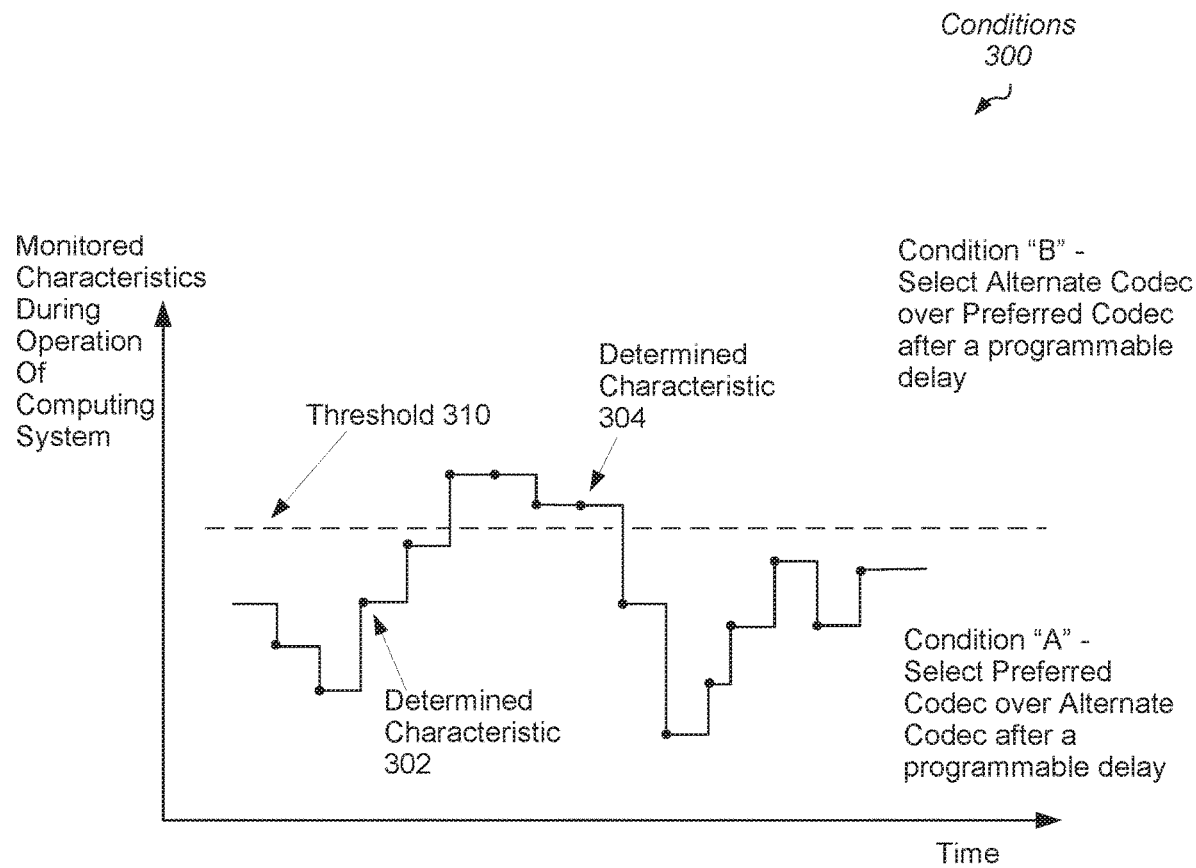
FIG. 3 is a block diagram of one embodiment of monitoring states of operation for a computing system.

Referring now to FIG. 3, a generalized block diagram of one embodiment of conditions 300 during operation of a computing system is shown. As shown, characteristics are sampled during each given period of time during operation of the computing system. In addition, the monitored characteristics are compared to a respective threshold. Determined characteristics 302 and 304 are two examples of the multiple determined characteristics. Examples of characteristics are compression rate, compressed data throughput, compression ratio, memory storage utilization, energy efficiency (reduced power consumption), utilization of hardware resources and so forth. Selected characteristics may also include performance-power states (p-states) of the hardware resources, if p-states are used, which in turn may be a function of thermal constraints. Further examples of characteristics are the factors 210 (of FIG. 2) described earlier.

In the illustrated embodiment, some characteristics exceed the threshold 310 while others are below the threshold 310. For example, determined characteristic 304 exceeds the threshold 310. In contrast, determined characteristic 302 is below threshold 310. Determining whether particular conditions are satisfied includes comparing current selected characteristics to respective thresholds. As shown, condition "A" is satisfied when the determined characteristics over time are below threshold 310. In contrast, condition "B" is satisfied when the determined characteristics over time exceed threshold 310.

In various embodiments, a hardware codec is selected as a preferred (initial) codec. In other embodiments, a software codec is selected as a preferred (initial) codec. For example, when compression ratio is a high priority, the preferred codec for data compression and decompression may be a software codec rather than a hardware codec. However, when power consumption is a high priority, the preferred codec may be a hardware codec rather than a software codec. In other examples, when compression rate or data compression throughput is a high priority, the preferred codec may be a hardware codec rather than a software codec. Threshold 310 is based on the factor, or characteristic (e.g., compression ratio, energy efficiency, compression rate), selected as the highest priority factor. In various embodiments, the highest priority factor(s) and threshold 310 are programmable values. As described earlier, different modes may be available for changing the factors and threshold 310.

In an embodiment, a compressor selector switches between a preferred codec and an alternate codec during operation of the computing system. In an embodiment, when the selected characteristic for the computing system are determined to be below threshold 310, the compressor selector selects the preferred codec (e.g., hardware codec, software codec). For example, when the highest priority is compression ratio, each of the determined characteristics (e.g., 302, 304, others) and threshold 310 may be based on monitored compression ratio and utilization of hardware resources and the performance-power states (p-states) of the hardware resources, if p-states are used. With compression ratio being the highest priority, the preferred codec may be the software codec and the alternate codec is the hardware codec. In another example, when compression rate is the highest priority, each of the determined characteristics (e.g., 302, 304, others) and threshold 310 may be based on monitored compression rate and utilization of hardware resources and the performance-power states (p-states) of the hardware resources, if e-states are used. With compression rate being the highest priority, the preferred codec may be the hardware codec and the alternate codec is the software codec.

Although the determined conditions are shown as data points, in some embodiments, the conditions may be a collection of values stored in table entries. In an embodiment, weights may be assigned to values and a single value is determined from the weights and the combination of the monitored values. In one example, a computing system may include two high-performance processors and four low-power processors. In one embodiment, the preferred codec is the software codec and the determined characteristics, such as characteristics 302 and 304, are based on the p-states of the processors and a number of processors being unavailable due to being fully scheduled with tasks already. Threshold 310 may be set in a manner to indicate the computing system is becoming overburdened, and therefore, compression tasks should use the alternate codec (e.g., hardware codec), rather than the preferred codec (e.g., software codec).

Continuing with the above example, compression tasks may originally be assigned to the four low-power processors while application tasks are assigned to the two high-performance processors. When the application tasks need to also be assigned to one of the low-power processors, the determined characteristic may not yet exceed threshold 310. When the application tasks need to be assigned to both low-power processors as well as both high-performance processors, the determined characteristic, such as characteristic 302, may still not yet exceed threshold 310 based on the p-states being used. Here, the determined characteristic is a combination of factors, each with an assigned weight. When all four processors have each of their respective cores assigned with application tasks and the corresponding p-states reach a particular value, the determined characteristic, such as characteristic 304, at a later time may exceed threshold 310. Accordingly, compression tasks are switched from being assigned to the preferred software codecs to being assigned to the alternate hardware codecs. Again, a programmable delay may be used to delay switching between the preferred codec and the alternate codec for data compression. In some embodiments, a different delay is used to delay switching from the alternate codec to the preferred codec.

As described earlier, in another example, when the highest priority is energy efficiency (low power consumption), the preferred codec is the hardware codec, and each of the determined characteristics (e.g., 302, 304, others) and threshold 310 may be based on allocated and valid data storage in memory. When the determined characteristic, such as characteristic 304, indicates the amount of allocated memory exceeds threshold 310, compression tasks are switched from being assigned to the hardware codec(s) to the alternate software codec(s). Again, a programmable delay may be used to delay the switching.

Figure 4:
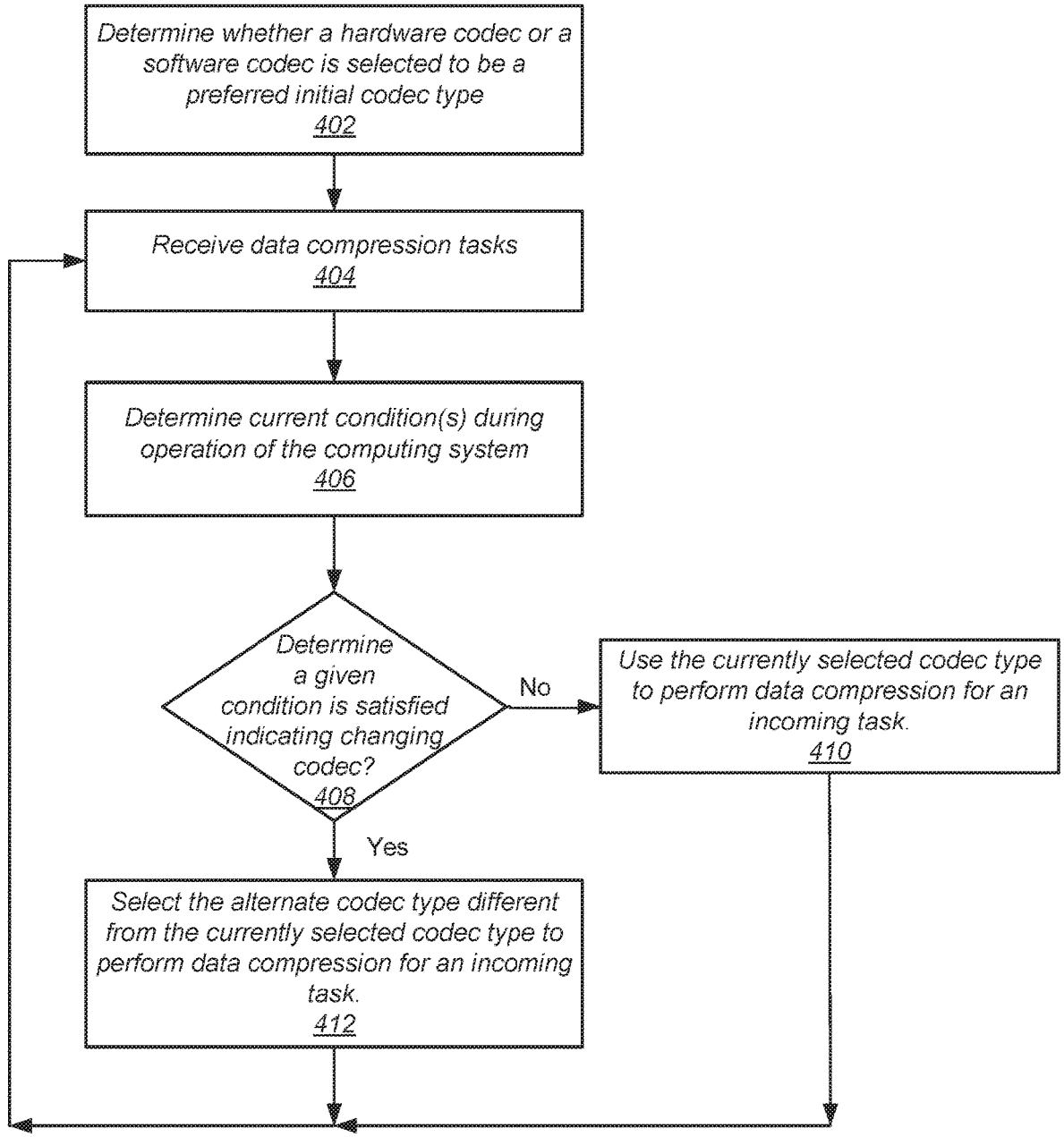
FIG. 4 is a flow diagram of one embodiment of a method for efficiently compressing data.

Referring now to FIG. 4, a generalized flow diagram of one embodiment of a method 400 for efficiently compressing data is shown. For purposes of discussion, the steps in this embodiment (as well as for FIG. 6) are shown in sequential order. However, in other embodiments some steps may occur in a different order than shown, some steps may be performed concurrently, some steps may be combined with other steps, and some steps may be absent.

A determination is made whether a hardware codec or a software codec is selected to be a preferred initial codec type for performing data compression in the computing system (block 402). Particular characteristics of the computing system are used to determine whether a hardware codec or a software codec is a preferred initial codec for performing data compression. The selection of the characteristics and the setting of the priority of the selected characteristics of the computing system are performed by designers and/or algorithms implemented in hardware, software or a combination of hardware and software. Examples of characteristics are compression rate, compressed data throughput, compression ratio, memory storage utilization, energy efficiency (reduced power consumption), utilization of hardware resources and so forth. Selected characteristics may also include performance-power states (p-states) of the hardware resources, if p-states are used, which in turn may be a function of thermal constraints. Further examples of characteristics are the factors 210 (of FIG. 2) described earlier.

For example, when compression rate or compressed data throughput is the selected characteristic with a high priority, hardware codecs may be preferred over software codecs as the preferred initial codec for performing data compression. However, when compression ratio is the selected characteristic with a high priority, software codecs may be preferred over hardware codecs as the preferred initial codec for performing data compression. When power consumption is the selected characteristic with a high priority, hardware codecs may be preferred over software codecs as the preferred initial codec for performing data compression.

A computing system receives a workload and processes instructions, commands and routines corresponding to the workload. The workload includes multiple tasks. As described earlier, in some embodiments, a task is a software thread of execution, which is a subdivision of a software process. In other embodiments, a task is a transaction. A transaction includes an indication of a command for a particular operation, but the transaction does not include all of the resources of a thread or a process. In yet other embodiments, a non-transaction control signal is used to initiate the processing of steps of a given task.

One or more of the received tasks are data compression tasks. The computing system and the comparator selector in the computing system receives data compression tasks (block 404). As described earlier, the data compression tasks are generated for a variety of reasons such as at least a background memory management and/or power management algorithm targeting a specified memory storage utilization, garbage collection of unused data, and saving space during context switches.

Current condition(s) are determined during operation of the computing system (block 406). Conditions are determined to be satisfied based on comparing current selected characteristics to respective thresholds. Examples of characteristics were provided earlier in the description of block 402. As described earlier, designers and/or algorithms implemented in hardware, software or a combination of hardware and software select the characteristics, set the priorities for the selected characteristics and also set the respective thresholds for comparisons.

If a given condition indicating changing the current selected type of codec is not satisfied ("no" branch of the conditional block 408), then the currently selected codec type is used to perform data compression for an incoming task (block 410). However, if the given condition indicating changing the current selected type of codec is satisfied ("yes" branch of the conditional block 408), then the alternate codec type different from the currently selected codec type is selected to perform data compression for an incoming task (block 412).

Figure 5:
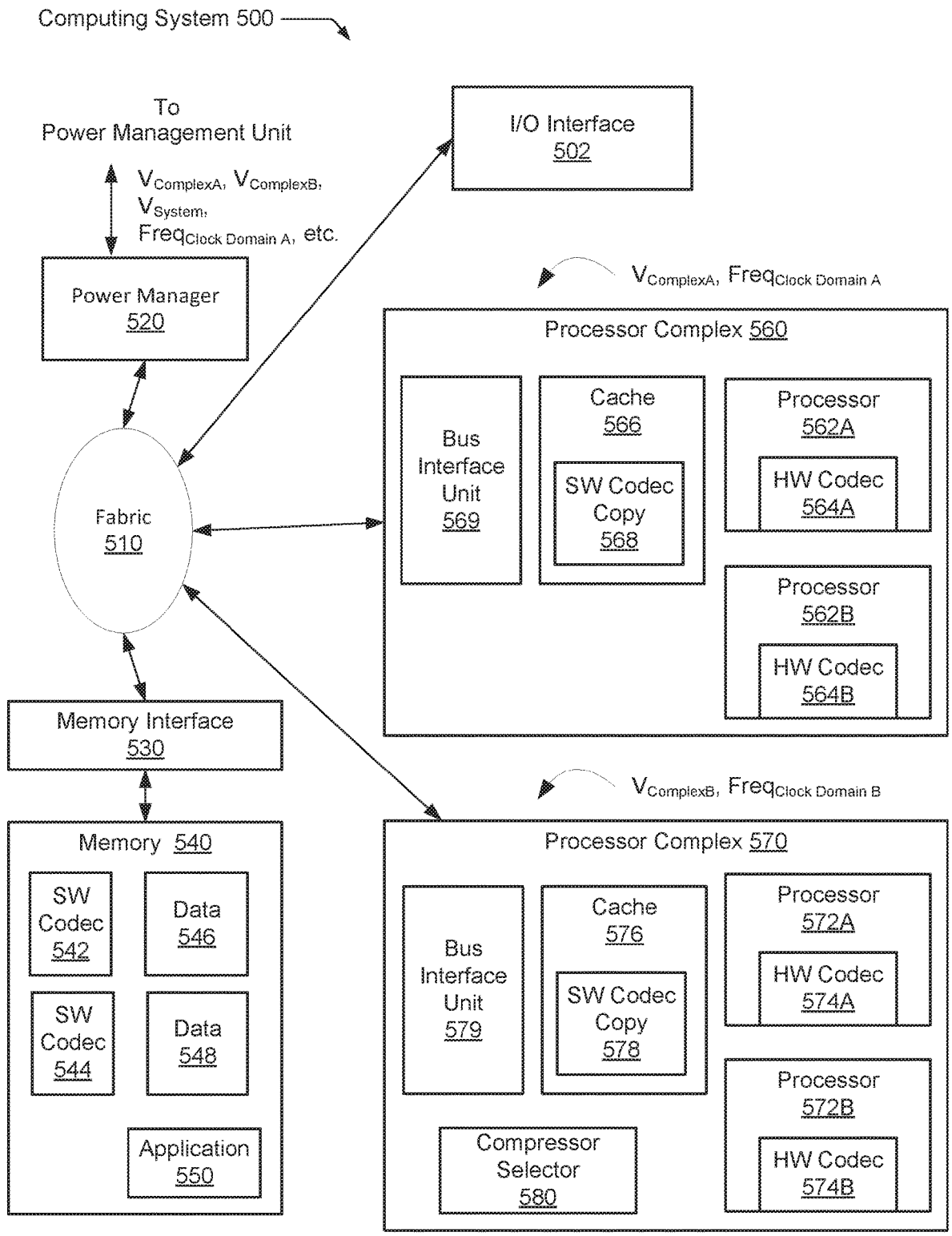
FIG. 5 is a block diagram of one embodiment of a computing system.

Turning now to FIG. 5, a generalized block diagram of one embodiment of a computing system 500 capable of selecting between hardware codecs and software codecs for data compression and decompression is shown. As shown, a communication fabric 510 routes traffic between the input/output (I/O) interface 502, the memory interface 530, the power manager 520 and the processor complexes 560-570. In various embodiments, the computing system 500 is a system on a chip (SOC) that includes multiple types of integrated circuits on a single semiconductor die, each integrated circuit providing a separate functionality. In other embodiments, the multiple functional units are individual dies within a package, such as a multi-chip module (MCM). In yet other embodiments, the multiple functional units are individual dies or chips on a printed circuit board.

Clock sources, such as phase lock loops (PLLs), interrupt controllers, and so forth are not shown in FIG. 5 for ease of illustration. It is also noted that the number of components of the computing system 500 (and the number of subcomponents for those shown in FIG. 5, such as within each of the processor complexes 560-570) may vary from embodiment to embodiment. There may be more or fewer of each component/subcomponent than the number shown for the computing system 500. As described earlier, the term "processor complex" is used to denote a configuration of one or more processor cores using local storage, such as a shared cache memory subsystem, and configured to process a workload together.

In various embodiments, different types of traffic flows independently through the fabric 510. The independent flow is accomplished by allowing a single physical fabric bus to include a number of overlaying virtual channels, or dedicated source and destination buffers, each carrying a different type of traffic. Each channel is independently flow controlled with no dependence between transactions in different channels. The fabric 510 may also be packet-based, and may be hierarchical with bridges, cross bar, point-to-point, or other interconnects.

In some embodiments, the memory interface 530 uses at least one memory controller and at least one cache for the off-chip memory, such as synchronous DRAM (SDRAM). The memory interface 530 stores memory requests in request queues, uses any number of memory ports, and uses circuitry configured to interface to memory using one or more of a variety of protocols used to interface with memory channels used to interface to memory devices (not shown). The memory interface 530 may be responsible for the timing of the signals, for proper clocking to synchronous dynamic random access memory (SDRAM), on-die flash memory, etc.

In various embodiments, one or more of the memory interface 530, an interrupt controller (not shown), and the fabric 510 uses control logic to ensure coherence among the different processors 562A-562B, 572A-572B and peripheral devices. In some embodiments, this circuitry uses cache coherency logic employing a cache coherency protocol to ensure data accessed by each source is kept up to date. An example of a cache coherency protocol includes the MOESI protocol with the Modified (M), Owned (O), Exclusive (E), Shared (S), and Invalid (I) states.

Although a single memory 540 is shown, computing system 500 may include multiple memory components arranged in a memory hierarchy. For example, memory 540 may include one or more of a shared last-level cache if it is not included in the memory interface 530, an SDRAM or other type of RAM, on-die flash memory, and so forth. As shown, memory 540 stores one or more applications such as application 550. A copy of at least a portion of application 550 is loaded into an instruction cache in one of the processors 562A-562B and 572A-572B when application 550 is selected by an operating system for execution.

Memory 540 stores a copy of the operating system (not shown) and copies of portions of the operating system are executed by one or more of the 562A-562B and 572A-572B. Data 546-548 may represent source data for applications in addition to result data and intermediate data generated during the execution of applications. In an embodiment, memory 540 also stores program code for software (SW) compression/decompression (codecs) 542-544. In some embodiments, each one of the SW codecs 542-544 includes program code for implementing an algorithm used for data compression and decompression. Although two SW codecs are shown, any number of compression/decompression algorithms may be implemented in program code and stored in memory 540.

When one of the SW codecs 542-544 is selected for execution, a copy of the selected SW codec is retrieved from memory 540 and stored in cache 566 of processor complex 560 or cache 576 of processor complex 570. For example, if processor complex 560 is selected for executing the selected SW codec, cache 566 stores SW codec copy 568, which represents the selected SW codec. Alternatively, if processor complex 570 is selected for executing the selected SW codec, cache 576 stores SW codec copy 578, which represents the selected SW codec. In other embodiments, program code for SW codecs 542-544 are stored in a read only memory (ROM) within one or more of the processor complexes 560-570. Therefore, the selected SW codec is not retrieved from memory 540.

The power manager 520 may be configured to control the supply voltage magnitudes requested from the external power management unit. There may be multiple supply voltages generated by the external power management unit for the computing system 500. For example, in the illustrated embodiment is a supply voltage indicated as $V_{Complex}$ for each of the processor complexes 560-570 and a supply voltage $V_{System}$ for one or more other components in the computing system 500. There may be multiple supply voltages for the rest of the computing system 500, in some embodiments. In other embodiments, there may also be a memory supply voltage for various memory arrays in the processor complexes 560-570 and the rest of the computing system 500. The memory supply voltage may be used with the voltage supplied to the logic circuitry (e.g. $V_{Complex}$ or $V_{System}$), which may have a lower voltage magnitude than that required to ensure robust memory operation.

In some embodiments, logic local to various components may control the power states of the components, including power up and power down and various other power-performance states (P-states) and operating modes for those components that support more than one P-state and operating mode. In various embodiments, the P-state is used to determine the operational voltage and operational frequency used by a component, whereas the operating mode determines how many sub-components are powered up such as particular execution pipelines.

In other embodiments, the power manager 520 may control power up and power down of other components of the computing system 500, or a combination of local control for some components and control by the power manager 520 for other components may be supported. The power manager 520 may be under direct software control (e.g. software may directly request the power up and/or power down of components) and/or may be configured to monitor the computing system 500 and determine when various components are to be powered up or powered down.

The external power management unit may generally include the circuitry to generate supply voltages and to provide those supply voltages to other components of the system such as the computing system 500, the off-die memory, various off-chip peripheral components (not shown in FIG. 5) such as display devices, image sensors, user interface devices, etc. The external power management unit may thus include programmable voltage regulators, logic to interface to the computing system 500 and more particularly the power manager 520 to receive voltage requests, etc.

In some embodiments, each of the processor complexes 560-570 operates with a same supply voltage (e.g., $V_{ComplexA}=V_{ComplexB}$) from a single power plane while also operating with different clock frequencies source from different clock domains. In other embodiments, each of the processor complexes 560-570 operates with a respective supply voltage (e.g., $V_{ComplexA} \neq V_{ComplexB}$) from different power planes. As shown, the processor complex 560 uses the voltage magnitude $V_{ComplexA}$ as an operational supply voltage and the clock frequency $F_{Clock\ Domain\ A}$ from a first clock domain. The processor complex 570 uses the voltage magnitude $V_{ComplexB}$ as an operational supply voltage and the clock frequency $F_{Clock\ Domain\ B}$ from a different, second clock domain.

As described earlier, the term "processor complex" is used to denote a configuration of one or more processor cores using local storage, such as a shared cache memory subsystem, and configured to process a workload together. Additionally, the processor complex is coupled through a communication channel subsystem to other components. As shown, processor complex 560 uses a bus interface unit (BIU) 569 for providing memory access requests and responses to at least the processors 562A-562B. Processor complex 560 also supports a cache memory subsystem which includes at least cache 566. In some embodiments, the cache 566 is a shared off-die level two (L2) cache for the processors 562A-562B although an L3 cache is also possible and contemplated. Processor complex 570 also uses an interface (not shown) for communication with the fabric 510. Processor complex 570 may have a similar configuration as processor complex 560 although differences may be found in one or more of the microarchitecture of processors 572A-572B, the size of the cache 576, and so forth.

In some embodiments, the processors 562A-562B use a homogeneous architecture. For example, each of the processors 562A-562B is a general-purpose processor, such as a central processing unit (CPU), which utilizes circuitry for executing instructions according to a predefined general-purpose instruction set. Any of a variety of instruction set architectures (ISAs) may be selected. In some embodiments, each core within processors 562A-562B supports the out-of-order execution of one or more threads of a software process and include a multi-stage pipeline. The processors 562A-562B may support the execution of a variety of operating systems (not shown).

In other embodiments, the processors 562A-562B use a heterogeneous architecture. In such embodiments, one or more of the processors 562A-562B is a highly parallel data architected processor, rather than a CPU. In some embodiments, these other processors of the processors 562A-562B use single instruction multiple data (SIMD) cores. Examples of SIMD cores are graphics processing units (GPUs), digital signal processing (DSP) cores, or otherwise.

In some embodiments, one or more cores in the processors 562A-562B include hardware circuitry for hardware (HW) compression/decompression (codecs) 564A-564B. In some embodiments, each one of the HW codecs 564A-564B implements a distinct algorithm used for data compression and decompression. Although two HW codecs are shown, any number of compression/decompression algorithms may be implemented in circuitry and used in one or more cores within processors 562A-562B. In other embodiments, the circuitry for the HW codecs 564A-564B may be located externally from the processors 562A-562B, but with processor complex 560. In yet other embodiments, the circuitry for the HW codecs 564A-564B may be located externally from processor complex 560 within a separate processing unit, an application specific integrated circuit (ASIC), or other within the computing system 500.

In various embodiments, each one of the processors 562A-562B uses one or more cores and one or more levels of a cache memory subsystem. The processors 562A-562B use multiple one or more on-die levels (L5, L2, L2 and so forth) of caches for accessing data and instructions. If a requested block is not found in the on-die caches or in the off-die cache 566, then a read request for the missing block is generated and transmitted to the memory interface 530.

In some embodiments, the components 572A-572B, 574A-574B, 576 and 579 of the processor complex 570 are similar to the components in the processor complex 560. In other embodiments, the components in the processor complex 570 are designed for lower power consumption, and therefore, include control logic and processing capability producing less performance. For example, supported clock frequencies may be less than supported clock frequencies in the processor complex 560. In addition, one or more of the processors 572A-572B may include a smaller number of execution pipelines and/or functional blocks for processing relatively high power consuming instructions than what is supported by the processors 562A-562B in the processor complex 560.

As shown, processor complex 570 includes a compressor selector 580. However, in other embodiments, the compressor selector 580 is included in processor complex 560 or in another processing unit (not shown). In some embodiments, the compressor selector 580 includes program code for implementing an algorithm for selecting between SW codecs 542-544 and HW codes 564A-564B and 574A-574B when an indication is generated for compressing or decompressing data such as data 546-548. In some embodiments, the program code for the compressor selector 580 is stored in memory 540, a copy is retrieved from memory 540 and stored in cache 576, and the copy is executed by one of the processors 572A-572B. Again, a copy of the program code for the compressor selector 580 may be stored in cache 566 and executed by one of the processors 562A-562B. In other embodiments, the compressor selector 580 is hardware circuitry for implementing the algorithm for selecting between SW codecs 542-544 and HW codes 564A-564B and 574A-574B when the indication is generated for compressing or decompressing data such as data 546-548.

The indication to compress data may be generated by the application 550 when executed by one of the processors 562A-562B and 572A-572B. In addition, the indication may be generated based on a context switch between applications. Further, the indication may be generated based on a background process such as a garbage collection process. Further still, the indication may be generated based on a background memory management and/or power management algorithm targeted a specified memory storage utilization. The indication to decompress data may be generated based on a context switch between applications to make the data ready for consumption by an application about to execute or execute again. The indication for compression or decompression may be an alert such as a non-transaction control signal, or alternatively, the indication is an instruction or a generated transaction. The indication may include information, such as arguments or fields, which specify the data to compress or decompress. For example, the information may specify an address of a source page and an address of a destination or target page in memory 540.

In response to receiving an indication to compress data, such as data 546-548 stored in memory 540, the compressor selector 580 selects one codec from the combination of the SW codecs 542-544 and HW codecs 564A-564B and 574A-574B to perform the data compression. The selection is based one or more factors. In various embodiments, the factors include one or more of the factors 210 described earlier.

Figure 6:
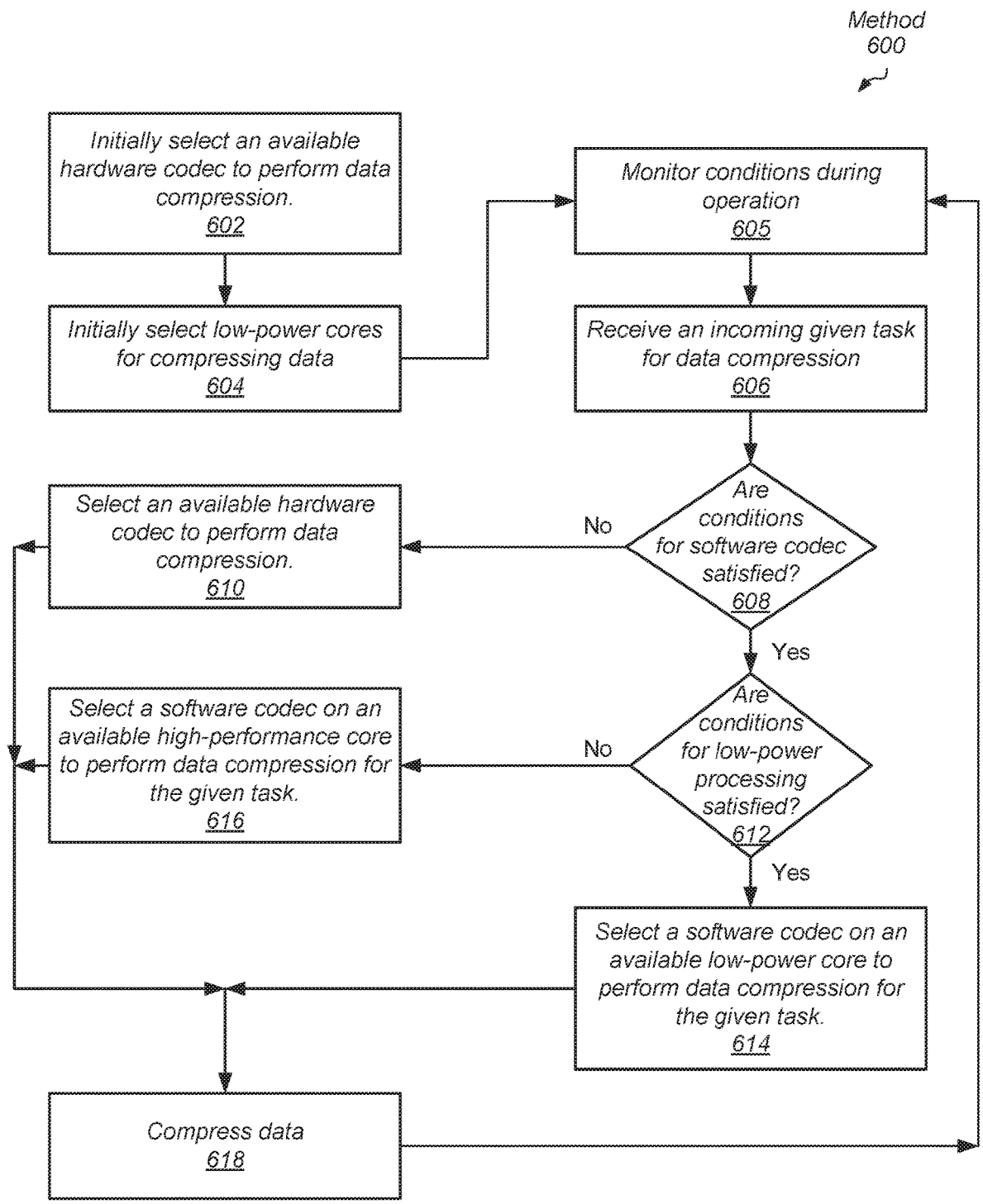
FIG. 6 is a flow diagram of another embodiment of a method for efficiently compressing data.

Referring now to FIG. 6, a generalized flow diagram of another embodiment of a method 600 for efficiently compressing data is shown. In various embodiments, a computing system includes one or more high-performance processor cores and one or more low-power (lower performance) processor cores. A hardware implementation is initially selected for codecs to be used for data compression (block 602). Low-power processor cores are initially selected for compressing data (block 604). A computing system receives a workload and processes instructions, commands and routines corresponding to the workload. The workload includes multiple tasks. As described earlier, tasks may be a software thread of execution or a transaction.

Conditions are monitored during operation of the computing system such as during the processing of a workload (block 605). Conditions are determined to be satisfied based on comparing current selected characteristics to respective thresholds. Examples of characteristics were provided earlier in the description of block 402 (of FIG. 4). As described earlier, designers and/or algorithms implemented in hardware, software or a combination of hardware and software select the characteristics, set the priorities for the selected characteristics and also set the respective thresholds for comparisons. In some embodiments, firmware or programmable control and status registers are used.

An incoming given task is received for data compression (block 606). If conditions for using a software codec are satisfied ("yes" branch of the conditional block 608), then one or more conditions for using low-power processing are checked. If conditions for using a software codec are not satisfied ("no" branch of the conditional block 608), then an available hardware codec is selected to perform data compression (block 610). If a hardware codec was already selected, then the selection remains the same. One condition for switching from using a hardware codec to using a software codec for data compression may be a target latency for one or more of application tasks/threads and compression tasks/threads increases above a threshold. For example, a computing device may transition to an idle operating mode based on no detected user input for a given time duration or other conditions. Therefore, the target latency for compression may rise above a threshold and a software codec is able to perform compression despite the longer latency of a software codec compared to a hardware codec. In some embodiments, this condition is also used to detect time periods for garbage collection.

A second condition for switching to using a software codec may be one or more compression queues for the hardware codecs have reach an occupancy level at or above a threshold (e.g., the number of entries of a queue increases to an occupancy level of 80%, etc.). A third condition for switching to using a software codec may be based on whether a difference between a target compression ratio and an expected compression ratio of a given hardware codec exceeds a threshold. The target compression ratio may be based on one or more of data type to compress, an amount of available system memory, and so forth. The expected compression ratio of the given hardware codec may be based on one or more of a history of achieved compression ratios for the given hardware codec, a current performance state of the given hardware codec, and so forth. Other types of conditions are possible and contemplated, which describe scenarios where a hardware codec is undesirable for compressing data.

A condition for switching to a hardware codec for data compression may be one or more queues for the software codecs for the low-power cores reach an occupied capacity above a threshold. A second condition for switching to a hardware codec may be one or more queues for application tasks for the low-power cores reach an occupied capacity above a threshold, and one or more hardware codecs in high-performance cores are available. A third condition for switching to a hardware codec may be a difference between the target latency for the data compression and the expected latency provided by the software codec running on a low-power core is above a threshold. Therefore, the expected latency is greater than the target latency by at least the threshold. Other types of software states are possible and contemplated, which describe scenarios where a software codec running on a low-power core is undesirable for compressing data.

If conditions for low-power processing are satisfied ("yes" branch of the conditional block 612), then a software codec is selected to perform data compression on an available low-power core (block 614). A condition for using software codecs running on low-power cores may include the queues for data compression tasks on the low-power cores have a filled capacity below a threshold. Another condition for using software codecs running on low-power cores may include the expected latency is not greater than the target latency by at least a threshold. If a software codec was already selected for running on a low-power core, then the selection remains the same.

If conditions for low-power processing are not satisfied ("no" branch of the conditional block 612), then a software codec is selected to perform data compression on an available high-performance core (block 616). In some embodiments, at least one of the one or more high-performance cores is reserved for executing only application workloads and not compression workloads in order to maintain a minimum level of performance for applications. In other embodiments, each of the one or more high-performance cores is available for running data compression.

Data is compressed by the selected codecs and the selected processor cores (block 618). Control flow of method 600 returns to block 605 where conditions during operation are monitored. For example, a history of achieved compression ratios and compression rates may be stored. If p-states are used in the computing system, the monitored compression rates and compression ratios may be partitioned based on the p-state used by the selected processor cores. In an embodiment, components such as the dynamic behavior monitor 220 and data characterization module 230 (of FIG. 2) may be used by the computing system.

Figure 7:
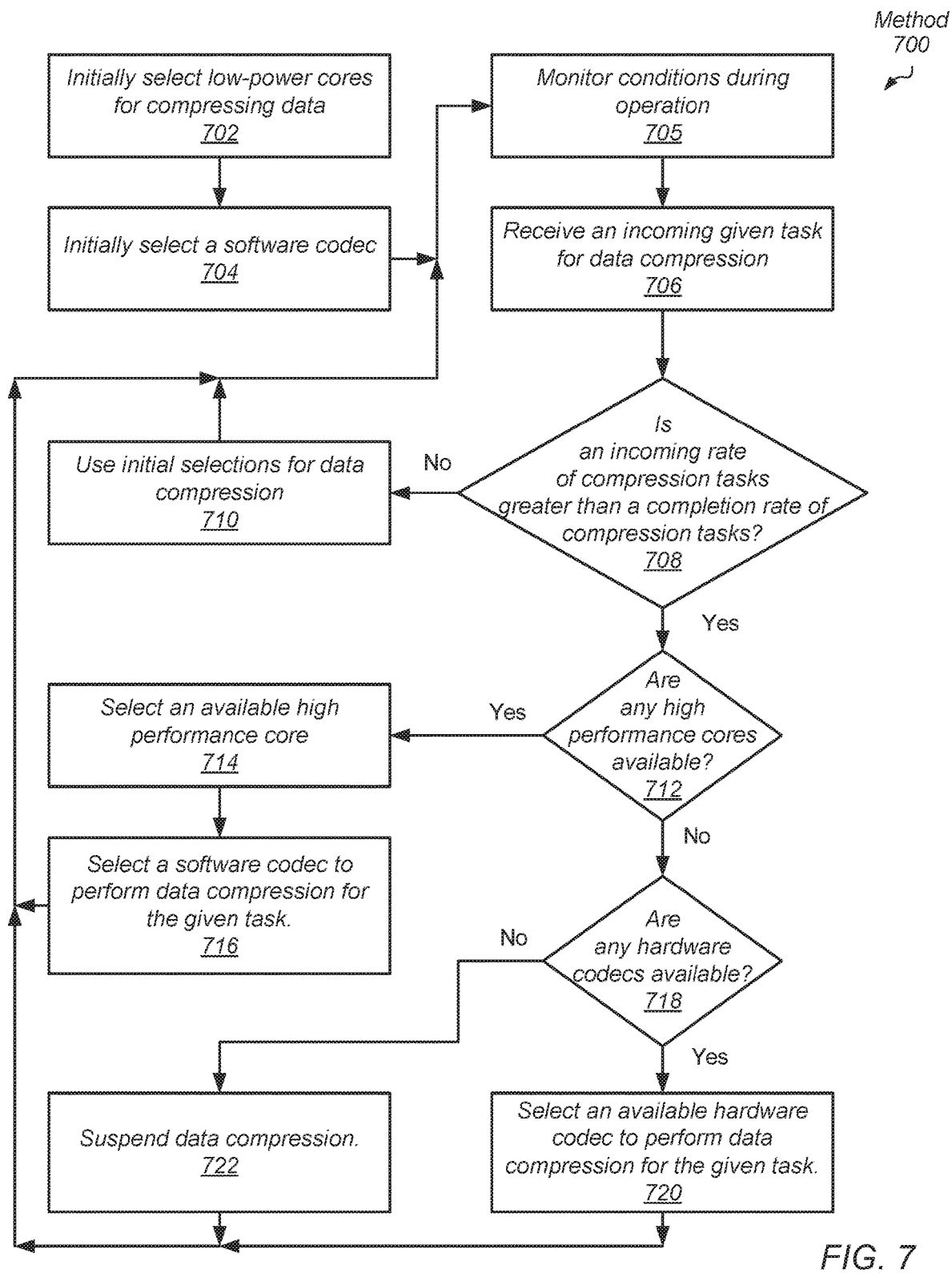
FIG. 7 is a flow diagram of another embodiment of a method for efficiently compressing data.

Referring now to FIG. 7, a generalized flow diagram of another embodiment of a method 700 for efficiently compressing data is shown. In various embodiments, a computing system includes one or more high-performance processor cores and one or more low-power (lower performance) processor cores. Low-power processor cores are initially selected for compressing data (block 702). A software codec is initially selected over hardware codecs to be used for data compression (block 704). Conditions are monitored during operation of the computing system such as during the processing of a workload (block 705). Conditions are determined to be satisfied based on comparing current selected characteristics to respective thresholds. Examples of characteristics were provided earlier in the description of block 402 (of FIG. 4).

One or more histories of conditions may be maintained. For example, a history of achieved compression ratios and compression rates may be stored. If p-states are used in the computing system, the monitored compression rates and compression ratios may be partitioned based on the p-state used by the selected processor cores. In an embodiment, components such as the dynamic behavior monitor 220 and data characterization module 230 (of FIG. 2) may be used by the computing system.

An incoming given task is received for data compression (block 706). If an incoming rate of compression tasks is not greater than a completion rate of compression tasks ("no" branch of the conditional block 708), then initial selections for data compression are used (block 710). Control flow of method 700 returns to block 706 where tasks for data compression are received. If the incoming rate of compression tasks is greater than the completion rate of compression tasks ("yes" branch of the conditional block 708), and any high-performance processor cores are available ("yes" branch of the conditional block 712), then an available high-performance processor core is selected for compressing the data (block 714). A software codec is selected to perform data compression for the given task (block 716).

If no high-performance processor cores are available ("no" branch of the conditional block 712), and if any hardware codecs are available ("yes" branch of the conditional block 718), then an available hardware codec is selected to perform data compression for the given task (block 720). However, if no hardware codecs are available ("no" branch of the conditional block 718), then data compression is suspended (block 722). Afterward, control flow of method 700 returns to block 706 where tasks for data compression are received. It is noted one or more of the checks performed in conditional blocks 708, 712 and 718 may also be performed in the earlier conditional blocks 608 and 612 of the earlier method 600 (of FIG. 6).

Figure 8:
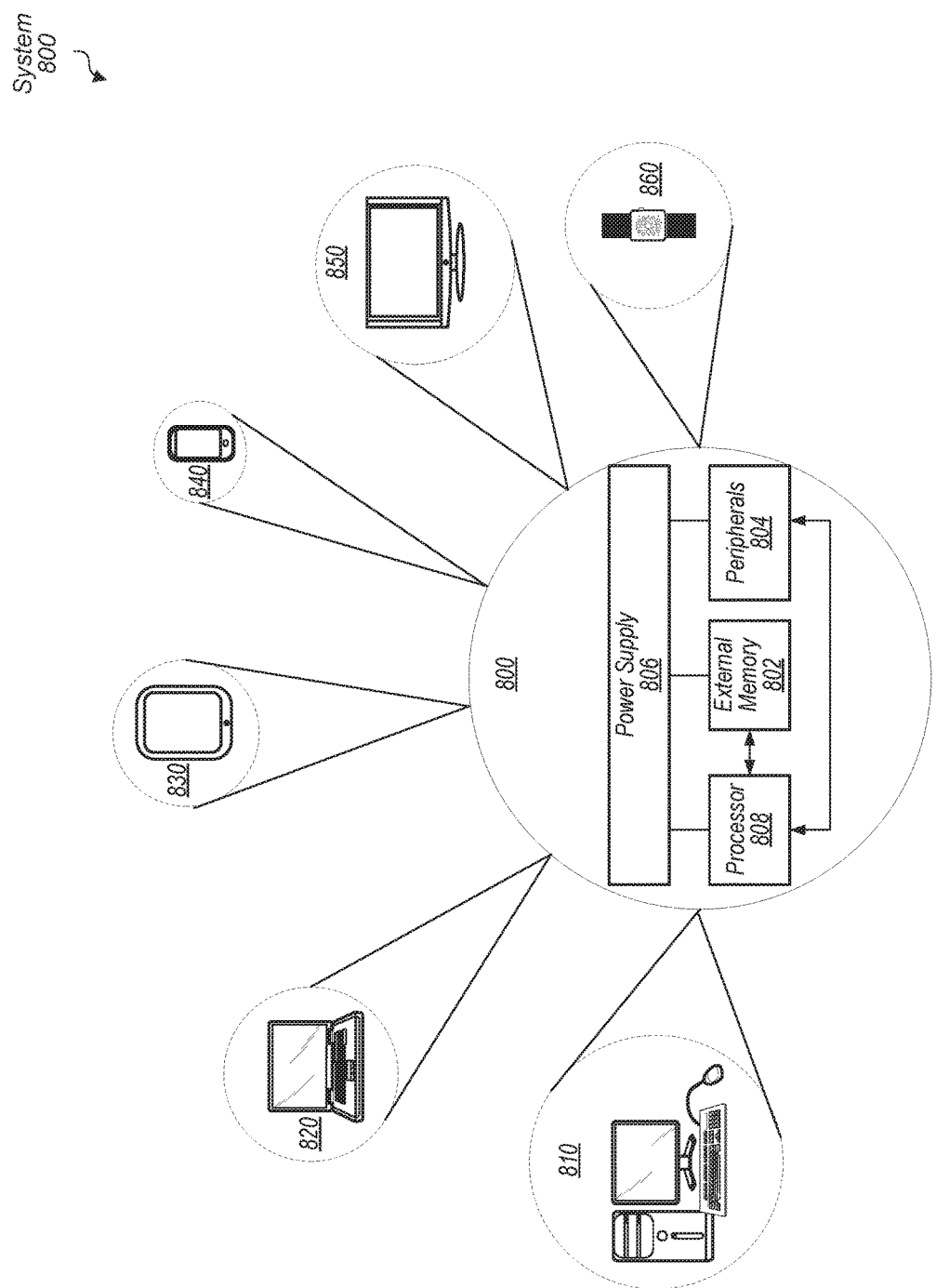
FIG. 8 is a block diagram of one embodiment of a system.

Turning next to FIG. 8, a block diagram of one embodiment of a system 800 is shown. As shown, system 800 may represent chip, circuitry, components, etc., of a desktop computer 810, laptop computer 820, tablet computer 830, cell or mobile phone 840, television 850 (or set top box configured to be coupled to a television), wrist watch or other wearable item 860, or otherwise. Other devices are possible and are contemplated. In the illustrated embodiment, the system 800 includes at least one instance of processor 808 which includes one or more compressor selectors. Processor 808 is coupled to an external memory 802. In various embodiments, processor 808 may be included within a system on chip (SoC) or integrated circuit (IC) which is coupled to external memory 802, peripherals 804, and power supply 806.

Processor 808 is coupled to one or more peripherals 804 and the external memory 802. A power supply 806 is also provided which supplies the supply voltages to processor 808 as well as one or more supply voltages to the memory 802 and/or the peripherals 804. In various embodiments, power supply 806 may represent a battery (e.g., a rechargeable battery in a smart phone, laptop or tablet computer). In some embodiments, more than one instance of processor 808 may be included (and more than one external memory 802 may be included as well).

The memory 802 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with a SoC or an IC containing processor 100 in a chip-on-chip configuration, a package-on-package configuration, or a multi-chip module configuration.

The peripherals 804 may include any desired circuitry, depending on the type of system 800. For example, in one embodiment, peripherals 804 may include devices for various types of wireless communication, such as Wi-Fi, Bluetooth, cellular, global positioning system, etc. The peripherals 804 may also include additional storage, including RAM storage, solid state storage, or disk storage. The peripherals 804 may include user interface devices such as a display screen, including touch display screens or multi-touch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
 a first processor configured to execute one or more applications;
 a plurality of codecs comprising one or more hardware codecs and one or more software codecs executable by the first processor; and
 a compressor selector configured to:
  select a first codec of the plurality of codecs for data compression;
  monitor one or more factors corresponding to a dynamic behavior of the apparatus, wherein values of the one or more factors vary in response to execution of tasks by the first processor;
  select a second codec of the plurality of codecs for data compression, based at least in part on a determination that the one or more factors indicate a first condition is satisfied during execution of the tasks by the first processor, wherein one of the first codec and the second codec is a hardware codec and another one of the first codec and the second codec is a software codec; and
  maintain the first codec as a selected codec for data compression, based at least in part on a determination that the first condition is not satisfied during execution of tasks by the first processor, wherein the determination that the first condition is satisfied comprises a determination that a difference between a target compression ratio and an expected compression ratio of the first codec exceeds a threshold.

2. The apparatus as recited in claim 1, wherein the first codec is a hardware codec and the second codec is a software codec.

3. The apparatus as recited in claim 2, wherein the expected compression ratio is based in part on a history of achieved compression ratios tracked by the compressor selector.

4. The apparatus as recited in claim 2, wherein the determination that the first condition is satisfied comprises a determination that one or more compression queues for the first codec have reached a given occupancy level.

5. The apparatus as recited in claim 1, wherein the first codec is a software codec and the second codec is a hardware codec.

6. The apparatus as recited in claim 5, wherein the determination that the first condition is satisfied comprises a determination that an incoming rate of compression tasks is greater than a completion rate of compression tasks.

7. The apparatus as recited in claim 5, wherein the determination that the first condition is satisfied comprises a determination that a priority level of energy efficiency is at a given level.

8. The apparatus as recited in claim 1, wherein the apparatus further comprises a second processor capable of processing performance higher than the first processor, and wherein the compressor selector is further configured to select the second processor instead of the first processor for data compression based at least in part on a determination that the second processor has a higher performance level than the first processor.

9. A method for data compression comprising:
 selecting, by a compressor selector, a first codec of a plurality of codecs for data compression;
 monitoring, by the compressor selector, one or more factors corresponding to a dynamic behavior of the apparatus, wherein values of the one or more factors vary in response to execution of tasks by the first processor;
 selecting, by the compressor selector, a second codec of the plurality of codecs for data compression, based at least in part on a determination that the one or more factors indicate a first condition is satisfied during execution of the tasks by the first processor, wherein one of the first codec and the second codec is a hardware codec and another one of the first codec and the second codec is a software codec; and
 maintaining, by the compressor selector, the first codec as a selected codec for data compression, based at least in part on a determination that the first condition is not satisfied during execution of tasks by the first processor, wherein the determination that the first condition is satisfied comprises a determination that a difference between a target compression ratio and an expected compression ratio of the first codec exceeds a threshold.

10. The method as recited in claim 9, wherein the expected compression ratio is based in part on a history of achieved compression ratios tracked by the compressor selector.

11. The method as recited in claim 9, wherein determining the first condition is satisfied comprises determining one or more compression queues for the first codec have reached a given occupancy level.

12. The method as recited in claim 9, wherein the first codec is a software codec and the second codec is a hardware codec.

13. The method as recited in claim 12, wherein determining the first condition is satisfied comprises determining an incoming rate of compression tasks is greater than a completion rate of compression tasks.

14. The method as recited in claim 12, wherein determining the first condition is satisfied comprises determining a priority level of energy efficiency is at a given level.

15. A system for selecting data compressors, the system comprising:
 a processor; and
 a non-transitory computer readable storage medium comprising program instructions operable to select between codecs, wherein the program instructions when executed by the processor cause the system to:
  select a first codec of a plurality of codecs for data compression, wherein the plurality of codecs comprises one or more hardware codecs and one or more software codecs executable by a first processor;
  monitor one or more factors corresponding to a dynamic behavior of the apparatus, wherein values of the one or more factors vary in response to execution of tasks by the first processor;
  select a second codec of the plurality of codecs for data compression, based at least in part on a determination that the one or more factors indicate a first condition is satisfied during execution of the tasks by the first processor, wherein one of the first codec and the second codec is a hardware codec and another one of the first codec and the second codec is a software codec; and
  maintain the first codec as a selected codec for data compression, based at least in part on a determination that the first condition is not satisfied during execution of tasks by the first processor, wherein the determination that the first condition is satisfied comprises a determination that a difference between a target compression ratio and an expected compression ratio of the first codec exceeds a threshold.

16. The system as recited in claim 15, wherein the expected compression ratio is based in part on a history of achieved compression ratios tracked by the compressor selector.

17. The system as recited in claim 15, wherein the first codec is a software codec and the second codec is a hardware codec.

18. The system as recited in claim 17, wherein determining the first condition is satisfied comprises determining an incoming rate of compression tasks is greater than a completion rate of compression tasks.

\* \* \* \* \*